United States Patent [19]

Miller

[11] Patent Number: 4,642,898
[45] Date of Patent: Feb. 17, 1987

[54] MARKING AND MEASURING TOOL

[76] Inventor: Dana K. Miller, 5237 Bouldercrest Rd., Ellenwood, Ga. 30049

[21] Appl. No.: 851,249

[22] Filed: Apr. 14, 1986

[51] Int. Cl.⁴ ............................ G01B 3/10; B43L 7/06
[52] U.S. Cl. ......................................... 33/138; 33/464
[58] Field of Search ................. 33/1 G, 138, 413, 464, 33/478

[56] References Cited

U.S. PATENT DOCUMENTS

| 980,340 | 1/1911 | Roch et al. | 33/464 |
| 2,571,569 | 10/1951 | Greenwood | 33/138 |
| 3,390,461 | 7/1968 | Anderson | 33/464 |
| 3,510,950 | 5/1970 | Andrews | 33/138 |
| 4,044,469 | 8/1977 | Posey | 33/138 |
| 4,200,984 | 5/1980 | Fink | 33/138 |

FOREIGN PATENT DOCUMENTS

| 3415317 | 10/1985 | Fed. Rep. of Germany | 33/138 |
| 58527 | 11/1946 | Netherlands | 33/464 |

Primary Examiner—Richard R. Stearns
Attorney, Agent, or Firm—Thomas & Kennedy

[57] ABSTRACT

A marking and measuring tool has a set of channels in which a bar may be slid. The channels extend from a flat side face adapted to be placed flush against a side of a work piece with one side of each channel extending towards a common line located in the plane of the side face.

6 Claims, 3 Drawing Figures

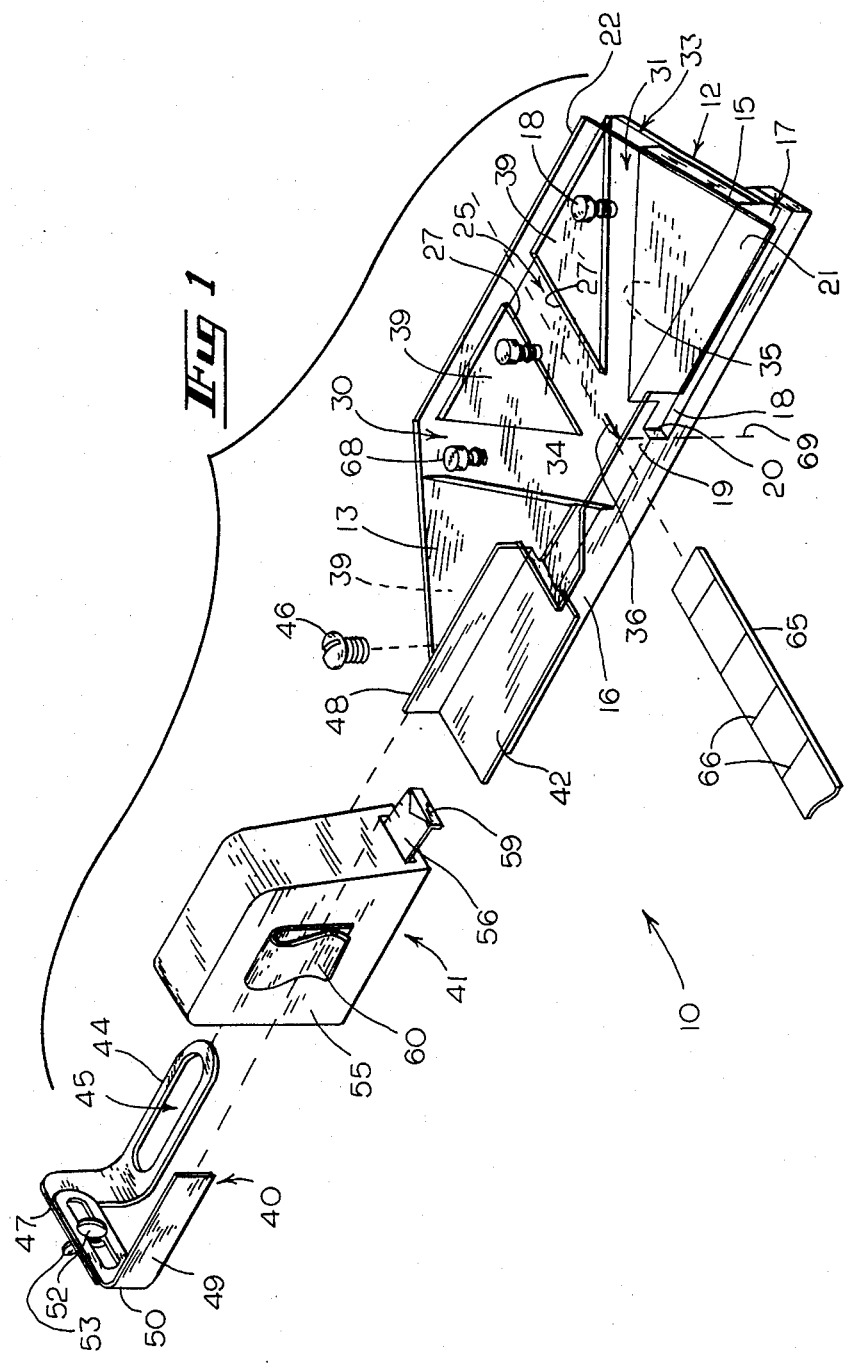

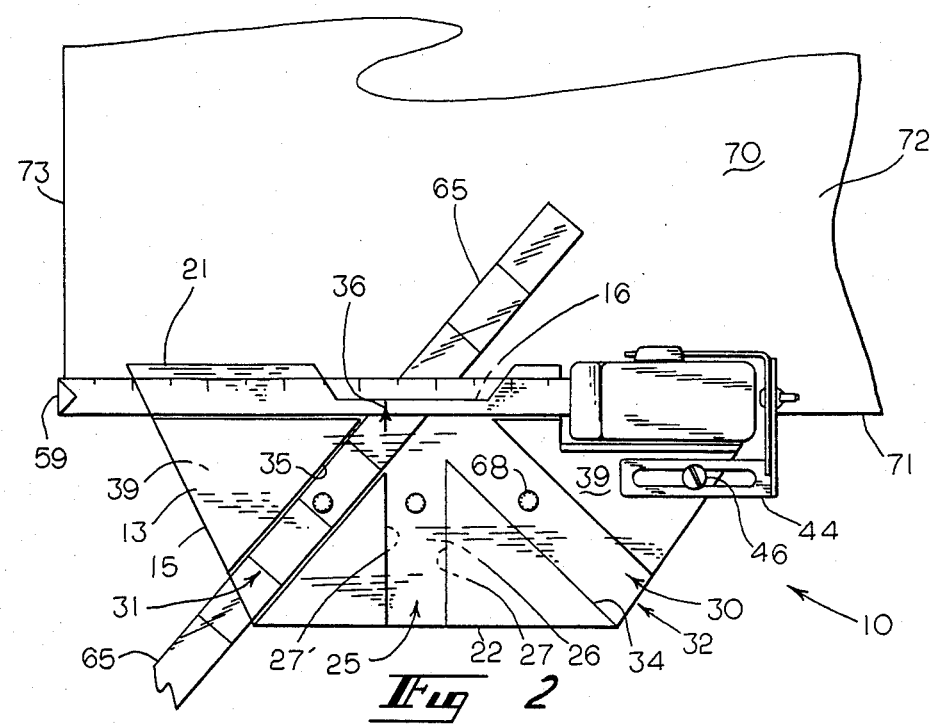
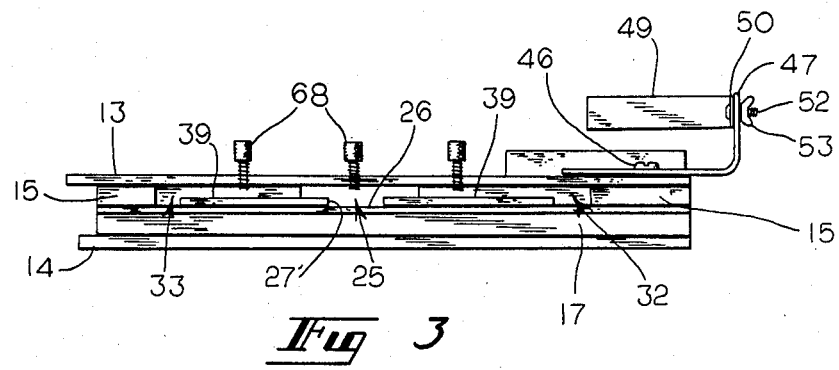

MARKING AND MEASURING TOOL

TECHNICAL FIELD

This invention relates to marking and measuring tools such as those often referred to as squares.

BACKGROUND OF THE INVENTION

Squares, T-squares and angles are commonly used in marking work pieces such as, for example, those made of wood, in preparation for cutting, beveling or otherwise in configuring the pieces. In use such a tool is typically aligned or set adjacent with one side of the work piece so that another of its sides extends at a desired angle with respect thereto. A line can then be drawn by a drawing instrument slid along that other side. This is a common practice of carpenters used in cutting wooden structural elements.

In addition to marking pieces preparatory to cutting them, the pieces must often also be measured so as, for example, to locate the cut line properly and to establish the length of the line. Today, flexible measuring tapes are commonly employed for this purpose. These tapes are typically housed in a rolled configuration within a tape housing such that an end of the tape to which a tab is secured extends out of an opening in the tape housing. In use, the tab is placed over an end of the object to be measured and the tape housing then moved over the object dispensing tape until the desired length is observed on the measuring tape overlaying the object. At this point the tape and housing are held in place with one hand while the other hand forms a mark on the piece beside the tape. The tape measurer is then removed from the object and a marking tool, again such as a square, angle or the like, located along the mark with its edge properly oriented with respect to a side of the work piece.

The just described marking and measuring tools are quite useful and today enjoy wide popularity. Nevertheless, work efficiency is lost in the time spent in exchanging one type of tool for another during independent marking and measuring activities. For example, a carpenter will typically carry independent tape measurers, squares and often other angles. In addition to having to carry several independent tools, the tools must be used sequentially in carrying out a marking and measuring operation as just described. This produces significant time losses in repeatedly replacing and substituting one tool for another. Thus, were a measuring and marking tool to be devised which could alleviate this problem a distinct advance in the art would be achieved. It is to the provision of such a tool that the present invention is primarily directed.

SUMMARY OF THE INVENTION

In one form of the invention a marking and measuring tool comprises a housing that has a flat side face adapted to be placed flushly against a side of an object to be marked or measured, and a plurality of coplanar guide channels that extend from adjacent the side face at a plurality of angles with respect to it. The channels all merge adjacent the side face with one side of each channel extending toward a common reference line lying substantially in the plane of the flat side face. The tool also includes a bar of a size and shape adapted to be slid within the guide channels.

In another form of the invention a square has a body formed with a flat side adapted to be placed flushly against a side of an object to be marked or measured and with a guide channel extending therethrough at a right angle with respect to the flat side. The square also includes a bar of a size and shape adapted to be slid within the guide channel and means for releasibly mounting a tape dispenser upon the flat body for dispensing a flexible measuring tape along the flat side and over an end of the guide channel.

BRIEF DESCRIPTION OF THE DRAWING

FIG. 1 is an exploded view, in perspective, of a marking and measuring tool embodying principles of the present invention.

FIG. 2 is a plan view of the marking and measuring tool illustrated in FIG. 1 shown in an assembled configuration while being used to form a mark on a work piece.

FIG. 3 is a side elevational view of the marking and measuring tool shown in FIG. 2.

DETAILED DESCRIPTION

With reference next to the drawing there is shown a marking and measuring tool or square indicated generally at 10 that has an at least partially transparent plastic body or housing 12. The housing is generally in the shape of a slab and has a flat top transparent surface 13 and a flat bottom surface 14 oriented parallel to the top surface. The housing has two side walls 15 and a flat, upright front wall or face 16 oriented perpendicular to the top and bottom surfaces. The front wall 16 is formed with an elongated groove or slot indicated at 17 which extends over a ledge 18 and then over another ledge 19 which is stepped up from ledge 18 by an upright wall 20. A support ledge 21 juts out over the face 16 as an extension of the top surface 13. The housing also has a split rear wall 22 oriented parallel to the front wall 16.

The housing is provided with a guide channel 25 which extends completely through the housing from the front face 16 to the rear wall 22 at a right angle to each. This channel has a flat bottom 26 and two side walls 27 and 27'. The housing is also provided with two other guide channels 30 and 31 that respectively extend from exits 32 and 33 in the sides 15 to merge with the channel 25 generally in the region adjacent the front face 16. It should be noted that one side wall 34 of channel 30, one side wall 35 of channel 31, and one side wall 27' of channel 25 are each directed towards a common abstract line 69 located by the tip of an arrow 36 which line extends along an edge of wall 20 where it joins the front face 16 and thus also along that force.

With continued reference to the drawing the marking and measuring tool is further seen to include a two-piece mount indicated generally at 40 for mounting a tape measurer indicated generally at 41 upon a pedestal 42 of the tool housing beside an upright pedestal wall 48. The mount includes a flat tongue 44 having an elongated slot 45 formed therein adapted to be mounted by a screw 46 flushly upon the housing top surface 13 beside the wall 48. The tongue curves upwardly at one end to a rear wall 47 that also has a slot. The mount further includes a side wall 49 that curves to a slotted rear wall 50 which is secured flush to wall 47 by a screw 52, that extends through the aligned slots, and by a wing nut 53. So constructed the mount is adapted to hold the housing 55 of the tape measurer 41 firmly upon the pedestal 42 with a clip 60 snapped onto wall 49 for the dispensing of flexible measuring tape 56, from an unshown roll of tape located within the housing, so as to pass through the slot or groove 17 formed in the front face 16 of the housing. The tape may be held in an exposed, measuring position by means of a tab 59 conventionally secured to one end of the tape at the zero dimension mark with the tab engaging the upright wall 20 that steps between ledges 19 and 18 that partially define the groove 17. In this position the zero dimension mark on the tape is located beneath the arrow 36. From here the tape may be pulled further through slot 17 underneath the support ledge 21 and beyond the housing.

The tool is further seen to include an elongated flat measuring bar 65 bearing lines of linear measurement 66. The bar is of a size and shape adapted to be slid within the channels 25, 30 and 31 upon the floors of the channels with the bar sides sliding along and being guided by the side walls of the channels. The bar may be slid within any of the three channels formed within the housing and then moved at the discretion of the user from one channel to another or removed entirely from the housing. Movement of the bar between channels may be done by sliding the bar completely out of one channel and reinserting it into another. Preferably, however, the bar is merely lifted off of the floor of one channel and moved over one of the two islands 39 that form the sides of adjacent channels beneath the top surface 13. That the top of the housing 12 is transparent facilitates this relocation. Finally, a set of set screws 68 is threaded through the top surface 13 of the housing to provide means for releasibly holding the bar 65 in various set positions within any of the three channels.

As shown in FIG. 2, the tool may be placed against a work piece 70 with its face 16 placed flushly against a side 71 of the piece and with its support ledge 21 slidably resting upon the work piece top 72. The tab 59 at the end of the tape 56 may then be placed against another side 73 of the work piece and the tool slid along the side 71 until the arrow 36 points to the desired distance from the edge 73 as indicated by a dimension on the measuring tape located beneath the arrow for marking the top 72 of the work piece. This one longitudinal portion of the tape 56 overlaps the piece top 72 closely adjacent side 71 while another longitudinal portion of the tape extends through groove 17 beneath support ledge 21. A 45 degree angle line may then be drawn by locating the bar 65 within channel 31 so that its left edge is aligned with the arrow 36 as shown in FIG. 2. Should a 90 or a 135 degree angle be desired instead, the bar 65 is merely lifted off of the floor of the channel 31 and then slid through the communicating space between the channels over one or both of the islands 39 to one or the other channel. Once this is done it will be noted that again the left side edge of the bar still passes beneath the tip of the arrow 36 where a drawn line may begin from the work piece edge 71 along its top surface. By linearly extending the bar the length of such a drawn line may be increased.

In the event that only measurement is desired without the drawing of lines of significant length, the bar 65 may be completely removed from the tool. On the other hand, if only lines are to be drawn without regard to dimensions, then the tape may be returned under its spring bias completely inside of the housing of the tape measurer and removed from the tool. Indeed, if the tape measurer is not frequently used, the mount 40 itself may be removed from the housing by merely unscrewing screw 46. If it is desired to mark several lines of a desired length as measured by the bar markings 66, then the bar may be set in place by tightening one of the screws 68 onto the bar so that the length of the bar remains the same as the tool is moved to various locations.

It thus is seen that a marking and measuring tool or square is now provided which overcomes problems associated with those of the prior art. The tool is highly versatile in that measurements may be made not only in locating the point at which lines start but also the length of the lines that are drawn. Various angles may be drawn including a right angle as well as 45 degree angles with the tool illustrated specifically in FIG. 2. Of course, other angles may be employed instead of or in addition to those, where desired. It therefore should be understood that the just described embodiment merely illustrates principles of the invention in one preferred form. Many modifications, additions and deletions other than those specifically suggested, may be made thereto without departure from the spirit and scope of the invention as set forth in the following claims.

I claim:

1. A marking and measuring tool comprising a housing that has a flat side face adapted to be placed flushly against a side of an object to be marked or measured and having a groove formed therein through which a longitudinal portion of a measuring tape may extend with another longitudinal portion of the tape overlaying the object to be marked or measured, and a plurality of substantially coplanar guide channels that extend from adjacent said side face at a plurality of angles with respect thereto with said channels merging adjacent said side face and with a side of each channel extending towards a common reference line lying substantially in the plane of said flat side face; and a bar of a size and shape adapted to be slid within said guide channels.

2. The tool of claim 1 having mounting means secured thereto for mounting a measuring tape housing adjacent an end of said groove.

3. The tool of claim 2 wherein said groove has a step located adjacent said reference point for engaging a tab mounted to an end of the measuring tape.

4. The tool of claim 2 further comprising a measuring tape mounted to said housing for dispensing of tape into said groove.

5. A square having a body formed with a flat side adapted to be placed flushly against a side of an object to be marked or measured and with a guide channel extending at least partially therethrough at a right angle with respect to said flat side and at least one other guide channel extending at least partially therethrough obliquely with respect to said flat side and which merges with said first mentioned guide channel adjacent said flat side; a bar of a size and shape adapted to be slid within said guide channels; and means for releasibly mounting a measuring tape dispenser upon said body for dispensing of flexible tape along said flat side and over an end of said guide channel.

6. The square of claim 5 wherein each of said guide channels has a side that extends linearly towards a common reference line located within the plane of said flat side.

* * * * *